United States Patent [19]

Langdon

[11] 4,420,983
[45] Dec. 20, 1983

[54] MASS FLOW MEASUREMENT DEVICE

[75] Inventor: Roger M. Langdon, Colchester, England

[73] Assignee: The Marconi Company Limited, Chelmsford, England

[21] Appl. No.: 287,293

[22] Filed: Jul. 27, 1981

[30] Foreign Application Priority Data

Feb. 28, 1980 [GB] United Kingdom ............... 8006685
Jan. 30, 1981 [GB] United Kingdom ............... 8102925
Jan. 30, 1981 [GB] United Kingdom ............... 8102961
Feb. 16, 1981 [GB] United Kingdom ............... 8104794

[51] Int. Cl.$^3$ .............................................. G01F 1/78
[52] U.S. Cl. .................................. 73/861.18; 73/32 A
[58] Field of Search .......... 73/861.18, 861.21, 861.35, 73/861.36, 861.37, 579, 592, 597, 59, 32 A

[56] References Cited

U.S. PATENT DOCUMENTS 2,741,918 4/1956 De Boisblanc ................. 73/861.18
2,839,915 6/1958 Roth et al. ............................ 73/59
4,193,291 3/1980 Lynnworth ....................... 73/32 A

FOREIGN PATENT DOCUMENTS

1486377 9/1977 United Kingdom .

Primary Examiner—Charles A. Ruehl
Attorney, Agent, or Firm—Spencer & Frank

[57] ABSTRACT

A device for measuring the mass flow of a fluid consists of a body which is arranged to resonate under the influence of a travelling flexure wave. Various embodiments of the invention are described. In certain embodiments in which the resonating body is in the form of a cylinder, the frequency of resonance is related to the mass of fluid flowing over the surface of the cylinder. In other embodiments, the wave velocity of the flexure wave is modified by a fluid flowing over the surface of the cylinder and amplitude modulation is introduced into the resonating flexure wave. The amplitude modulation is related to the mass of fluid flowing and an output indicative of the mass flow is produced. In further embodiments the body is in the form of a flat vane. The wave velocity of the flexure wave is modified by the fluid over the surface of the vane, and the wave velocity is monitored by comparing the relative phases of the flexure wave at different points along the vane. The phase difference is related to the mass of fluid flowing and an output indicative of the mass flow is produced.

14 Claims, 21 Drawing Figures

Fig. 1.

Fig. 3a.  OUTPUT FROM VFO 10

Fig. 3b.  INPUT TO TRANSDUCER 3

Fig. 3c.
Fig. 3d.  } INPUTS TO TRANSDUCER 4 WITH ALTERNATIVE SETTINGS OF SWITCH 11

MASS FLOW MEASUREMENT DEVICE

BACKGROUND OF THE INVENTION

This invention relates to mass flow measurement devices, that is to say, devices which measure the mass of fluid which is flowing passed a particular point. Devices of this kind find particular application for example, in circumstances where precise amounts of liquid or gaseous fuels are to be metered. Because the density of the fluid may not be constant, it is often not sufficient merely to monitor the volume of fluid passing a particular point. The present invention seeks to provide an improved mass flow measurement device.

SUMMARY OF THE INVENTION

According to this invention a mass flow measurement device includes means for generating a travelling flexure wave in the surface of a body; means for causing a fluid to flow over said surface; and means for detecting the effect of the fluid on the wave velocity of the flexure wave.

In a first aspect of this invention, the frequency of the travelling flexure wave is controlled so as to maintain said body in resonance, with the frequency of resonance being indicative of the mass flow rate of said fluid. The frequency of resonance is related to the effective wave velocity of the travelling flexure wave.

Preferably said body is in the form of a thin walled tubular member, with the fluid being arranged to flow over at least part of its outer tubular surface.

Preferably said body is a hollow cylinder which is rigidly supported at at least one end, with the flexure wave being arranged to travel circumferentially around the outer surface of the cylinder, and the fluid being constrained to flow around the cylinder with its motion having a circumferential component.

The fluid flow may also possess a component of motion along the length of the cylinder, but this does not significantly affect the wave velocity of the flexure wave which is travelling circumferentially around the cylinder.

In a second aspect of this invention, two travelling flexural waves are generated which travel in opposite directions in the surface of said body, so as to generate a resultant standing wave pattern, with the flow of said fluid being such as to increase the wave velocity of one of the travelling flexural waves and to decrease the wave velocity of the other travelling flexural wave, whereby said standing wave pattern is amplitude modulated at a frequency related to the difference in wave velocities of said two travelling flexural waves.

Preferably the extent to which the wave velocity of one travelling wave is increased is equal in extent to which the wave velocity of the other is decreased.

In a third aspect of this invention, means are provided for monitoring the phase of the flexure wave at at least two points on the body with the different points being spaced apart in the direction of the fluid flow.

Preferably means are provided for producing an output signal which has a reference value when no fluid is flowing over said body and which increases in dependence on the resulting phase difference at said points when the fluid flows.

Preferably the reference value is zero.

Preferably again the frequency of the flexure wave is controlled so as to maintain said body in resonance. In this way minor changes in the environment in which the measurement device is situated can be compensated, and in particular compensation can be provided for changes in temperature.

Preferably said body comprises a thin elongate vane mounted within a hollow tube through which fluid flows when the device is operating.

Preferably piezo electric sensors are positioned at two points along the thin vane so as to enable the relative phases of the flexure waves to be monitored at those points.

BRIEF DESCRIPTION OF THE DRAWINGS

The invention is further described by way of example with reference to the accompanying drawings, in which.

DESCRIPTION OF THE PREFERRED EMBODIMENTS

Figure 1:
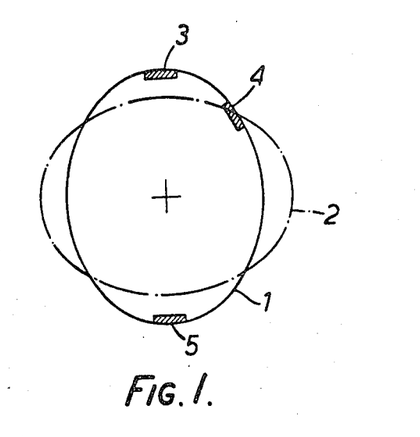
FIG. 1 is an explanatory diagram relating to the mode of operation of a mass flow measurement device in accordance with the first aspect of the present invention.

FIG. 1 shows a section through a cylindrical metal shell having very thin walls and which is mounted in such a way that it can support flexural vibrations around its circumference. The vibrations are generated in a cylinder 1 by means of piezo electric transducers 3 and 4 which are attached to the wall of the cylinder. The vibration frequency is adjusted (by means described subsequently with reference to FIG. 2) so that the frequency is equal to a mechanical resonance frequency of the cylinder 1. In FIG. 1, the cylinder is shown vibrating in its fundamental cylindrical flexural mode in which references 1 and 2 show the opposite extreme positions of the cylinder surface when it is excited in this mode. The elliptical distortions of the cylinder are much exaggerated in the drawing for the sake of clarity and in practice the movement of the cylinder wall in a radial direction would be extremely small as compared with the diameter of the cylinder.

When an electrical signal at the flexural resonance frequency is applied to the transducer 3, two contra rotating flexural waves are generated having the same amplitude and frequency. These two waves combine together to produce the characteristic wave pattern shown in FIG. 1. The second identical transducer 4 is attached to the wall 1 at a position which is displaced circumferentially from transducer 3 by a quarter of a flexural wavelength and it is driven by a signal of equal amplitude to that which drives transducer 3, but which is phase shifted with respect to that signal by $\pi/2$ radians. The effect of transducer 4 is to produce a second pair of contra rotating flexural waves, which are of equal amplitude to the first pair generated by transducer 3, but they are displaced in phase. Under these circumstances the pair of waves travelling in one direction around the cylinder will have the same phase and so will add constructively to produce a wave of twice the amplitude, whereas the pair of waves travelling around the cylinder in the other direction will be exactly $\pi$ radians out of phase with respect to each other and so will combine destructively to produce a wave of zero amplitude. The net result is the generation of a travelling flexure wave which travels around the cylinder in one direction only. When the cylinder surface is in contact with a fluid (liquid or gas), having a component of motion aligned with the direction of travel of the travelling flexure wave, the motion of the fluid causes a change in the speed of travel of the flexure wave. The wave velocity increases if the fluid is moving in the same direction as the wave, but the wave velocity decreases if it is moving in the opposite direction. The effect of the change in wave velocity is to cause a corresponding change in the resonant frequency of vibration of the cylinder. The magnitude of the change of the wave velocity, and hence the frequency change, is approximately proportional to the component of the angular velocity of the fluid about the axis of the cylinder 1 and is also approximately proportional to the fluid density. Consequently, the change in resonance frequency is approximately proportional to the angular momentum of the fluid.

Figure 2:
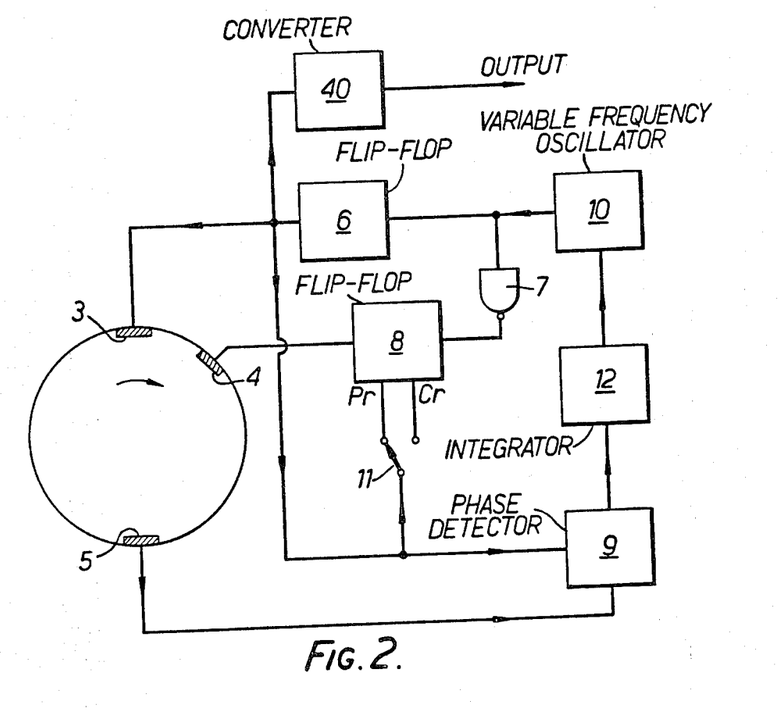
FIG. 2 is a circuit diagram relating to the generation and detection of a travelling flexure wave.
Figure 3A:
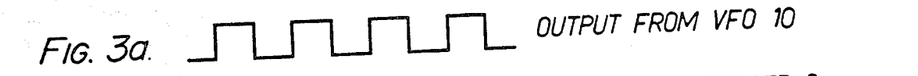
FIGS. 3a, 3b, 3c, and 3d are explanatory diagrams relating thereto.
Figure 3B:
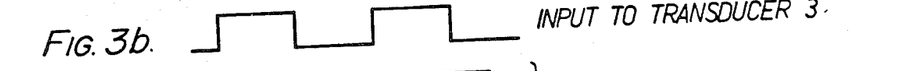
Figures 3C, 3D:
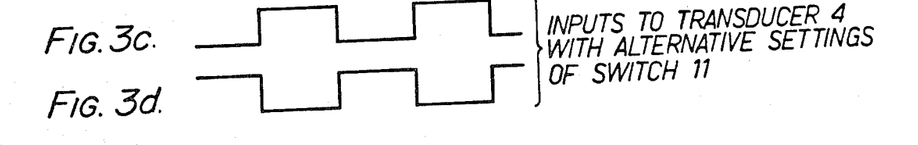

FIG. 2 shows a circuit diagram which is used to maintain the cylinder 1 in vibration at resonance. In order to detect the travelling flexure wave, an additional piezo electric transducer 5 is attached to the cylinder wall at a position diammetrically opposite transducer 3. A variable frequency oscillator 10 provides an output signal which is applied via a flip-flop bistable 6 to transducer 3 and via an inverter 7 and a further flip-flop bistable 8 to transducer 4. The flip-flop bistables 6 and 8 and the inverter 7 act together so that the signal applied to transducer 4 is always $\pi/2$ out of phase with that applied to transducer 3.

The oscillator 10 provides a frequency which is twice that applied to the transducers 3 and 4, as the flip-flop bistables 6 and 8 act as divide-by-two frequency dividers. The bistables are arranged to trigger only on positive going transitions of the signal applied to them, so that as a consequence of the inversion provided by inverter 7, the output waveforms provided to the transducers 3 and 4 are mutually displaced by a quarter of a cycle. The appropriate waveforms are shown in FIGS. 3a, 3b, 3c and 3d which indicate the operation of the bistables and the inverter. Thus the phase difference between the signals applied to transducers 3 and 4 is $\pm\pi/2$, irrespective of frequency. A positive or negative value of phase shift can be selected by means of a switch 11, which can be set to either the Preset or Clear terminals of bistable 8. Consequently the direction of travel of the flexure wave is reversed by operating this switch 8. Even though square wave signals are applied to the transducers 3 and 4, sinusoidal flexure waves are generated as the cylinder resonates only at the fundamental input frequency, and not at harmonics of this frequency. The output of transducer 5 is applied to one input of a phase detector 9, the other input of which is obtained directly from the output of the flip-flop bistable 6. The output of the phase detector 9 is applied via an integrator 12 to the frequency control input of the variable frequency oscillator 10. By means of this feedback loop, the frequency of oscillation of oscillator 10 is maintained at twice the resonance frequency of the cylinder 1 and tracks the changes in resonance frequency which result from the effect of a fluid flowing over the surface of the cylinder. Since the resonance frequency is a measure of the mass flow of the fluid, the output of the flip-flop bistable 6 is applied to a converter 40, which derives from the frequency applied to it an output signal which is indicative of the mass flow. In general, it will be necessary to calibrate the converter 40, so as to take into account the characteristics of the measurment device, as the sensitivity of the device will depend on the way in which the fluid is constrained to flow over the surface of the cylinder.

Figure 4A:
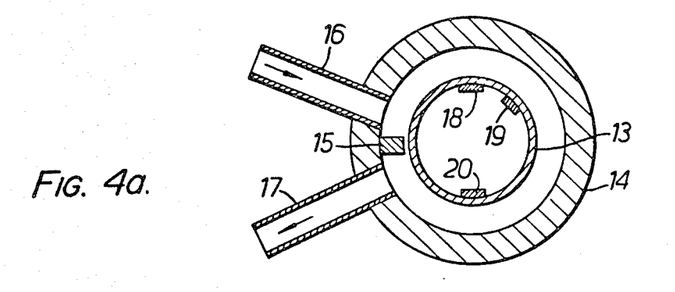
FIGS. 4a, 4b, 5a, 5b, 6a and 6b illustrate devices in accordance with the first aspect of the present invention.
Figure 4B:
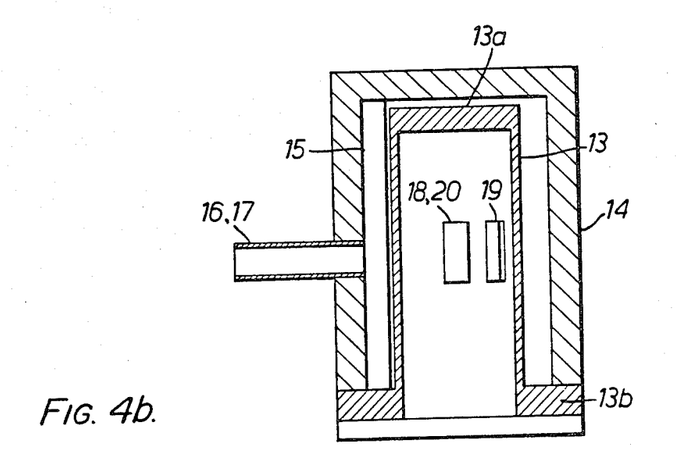

One embodiment of the present invention is illustrated in FIG. 4a, and 4b which show a plan view and a sectional elevation view, respectively, of a measurement device. A vibrating cylinder 13 is closed at one end by means of an end piece 13a attached to the cylinder wall. The other end of the cylinder is attached to a stiff mounting flange 13b. The cylinder 13 is surrounded by a cylindrical housing 14, which is sealed to the mounting flange 13b such that fluid flows only in the annular chamber formed between the cylinder 13 and the housing 14. The inlet port 16 and an outlet port 17 are provided to allow fluid to circulate in this annular space and a baffle 15 is attached to the inner wall of the housing 14 at the position shown to ensure that the fluid entering the chamber via inlet port 16 flows around the outside of the cylinder 13 in a circumferential direction before leaving via outlet port 17. The baffle 15 is not attached to the cylinder 13, since this would adversely affect the resonance properties of the cylinder. In practice, the degree of clearance left between the baffle 15 and the cylinder 13 can be very small indeed as the extent of the physical movement of the wall of cylinder 13 is very small. Piezo electric transducers 18, 19 and 20 are attached to the inside surface of cylinder 13 and have the same functions and positions as transducers 3, 4 and 5 respectively. It will be noted that the fluid does not reach the transducers themselves, which need not therefore be specifically designed or sealed against the adverse affects of fluids.

The fluid which is admitted at inlet port 16 and expelled at outlet port 17 causes an upward shift in the resonance frequency of the flexure vibrations introduced in the cylinder when the transducers 18, 19 and 20 are connected such as to produce a flexure vibration which travels around the cylinder wall in a clockwise direction. The magnitude of the frequency shift is approximately proportional to the mass flow rate of the fluid entering and leaving ports 16 and 17.

Switches (not show) are provided so as to reverse the sense of the phase shift applied to transducers 18 and 19. By this means the flexure vibration of the cylinder is arranged to rotate in the opposite (anti-clockwise) direction and consequently the resonance frequency is shifted downwards, i.e. decreases, by the fluid flow by an amount of similar magnitude to the previous upward shift. By operating the switch cyclically both the upward and downward frequency shifts can be measured by a frequency counter (incorporated in converter 40) and the difference frequency obtained will be approximately proportional to the mass flow of the liquid. By reversing the direction of travel of the flexure wave in this way certain errors in the system can be cancelled out. For example, both clockwise and anti-clockwise flexural resonance frequencies are affected by similar amounts by changes in fluid pressure and temperature.

Figure 5A:
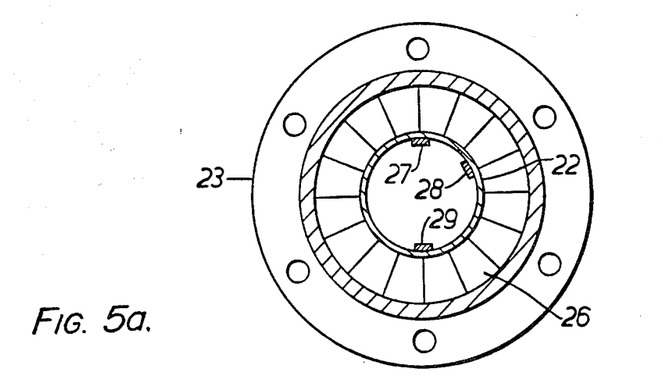
Figure 5B:
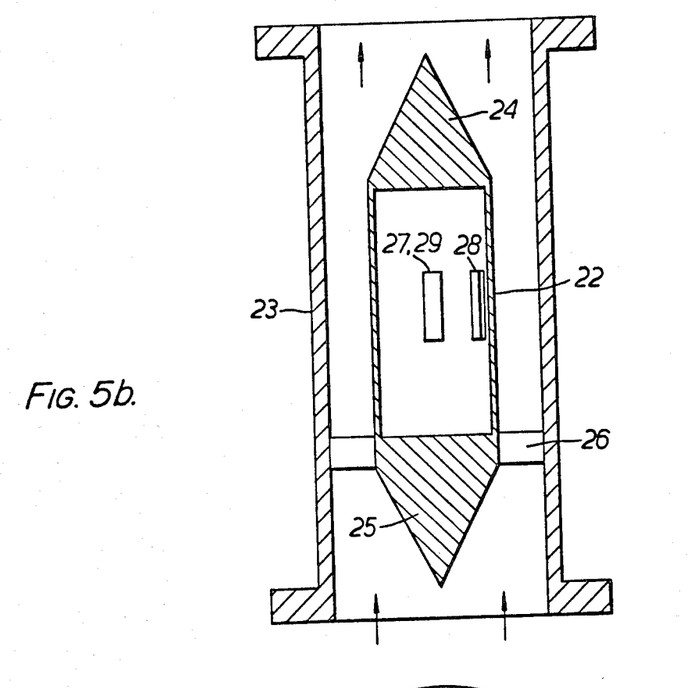

An alternative mass flow measurement device in accordance with the present invention is illustrated in FIG. 5a and 5b, which show, respectively, a plan view and a sectional elevation view. This device is more suitable in circumstances in which high fluid flow rates are present as the device provides less obstruction to the fluid flow. A vibratory cylinder 22 is sealed off on both ends by relatively massive end pieces 24 and 25 and is mounted in a duct 23 through which the fluid is passed. Piezo electric transducers 27, 28 and 29 are attached to the inside surface of the wall of the cylinder 22 to perform the functions of transducers 3, 4 and 5 respectively, which were illustrated in FIG. 1. The cylinder 22 is mounted inside the duct 23 by means of a fixed turbine 26, so as to be axially aligned with the axis of the duct. The turbine 26 is placed upstream of the cylinder 22 so that the fluid (which flows in the direction of the arrows) is induced to move in a helical manner about the axis of the duct. This produces a component of motion of the fluid, which is directed circumferentially around the outer surface of the cylinder 22.

Downstream of the turbine 26 the fluid rotates about the cylinder at a rate which is approximately proportional to the axial velocity of the fluid in the duct 23 and consequently its component of angular momentum about the axis of the cylinder 22 is approximately porportional to the mass flow rate. This induces a change in the resonance frequency of the cylinder 22 and the measurement of mass flow rate is performed in a manner which is similar to that illustrated in connection with FIGS. 2, 4a, and 4b. It is preferable in practice for the electrical connections to transducers 27, 28 and 29 to be taken to the outside of the duct 23, without coming into contact with the fluid and this can be achieved by any convenient means, e.g. by passing them through channels formed in one of the blades of turbine 26.

The sensitivity of the devices described in connection with FIGS. 4a, 4b and 5a, 5b can be enhanced by minimizing the thickness of the cylinder wall or by reducing the width of the annulus between the cylinder and the corresponding outer wall. When the device is used for the mass flow measurement of gases very high sensitivities are required and a thin walled cylinder is needed. Under these circumstances the cylinder may not be strong enough to withstand the full gas pressure and an alternative construction, which equalizes the pressures on the inside and outside of the cylinder is shown in FIGS. 6a and 6b.

Figure 6A:
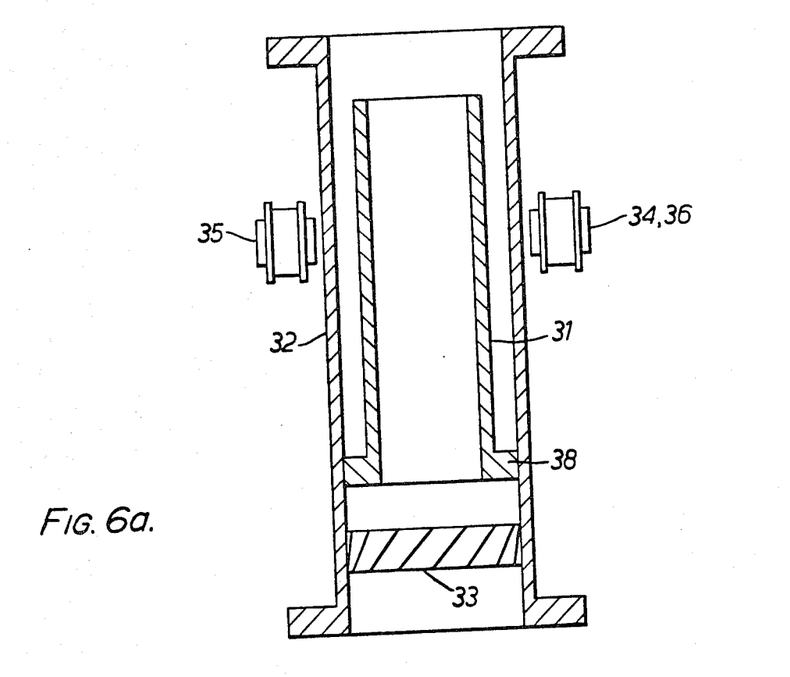
Figure 6B:
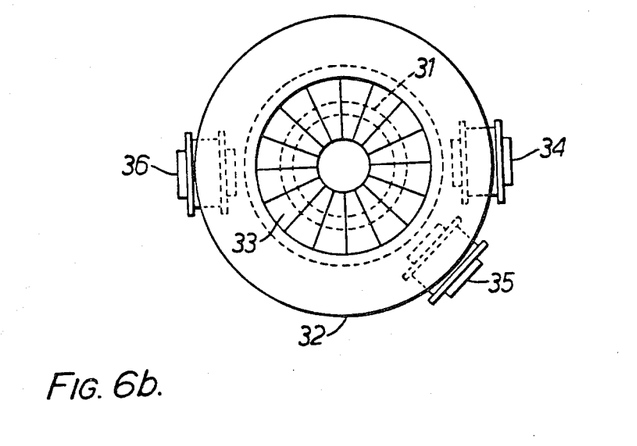

Referring to FIGS. 6a and 6b, a thin walled vibrating cylinder 31 is mounted inside a section of relatively massibe pipe 32, which carries a flowing fluid. The cylinder 31 is attached to the pipe 32 by a mounting arrangement 38, which enables the fluid to flow over both the inner and outer surfaces of the cylinder 31. In this embodiment of the invention, the cylinder 31 is formed of a ferromagnetic material and is introduced into vibration by means of electromagnetic transducers 34, 35 and 36, which are placed outside the pipe 32. The transducers 34, 35 and 36 perform the same function as the transducers 3, 4 and 5 respectively in order to generate a unidirectional travelling flexure wave in the wall of the cylinder 31. A stationary turbine 33 consisting of a ring of inclined turbine blades, is placed in the pipe 32 upstream of the cylinder 31 in order to generate a helical motion in the fluid in the vicinity of the cylinder 31, so as to produce a component of motion which is directed circumferentially around the cylinder 31. The mode of operation of this device is analogous to that illustrated in FIG. 2 and it produces an output signal representative of the mass flow rate in similar manner. As previously mentioned the conversion factor provided by the converter 40 is adjusted in accordance with the characteristics of the device with which it is used and it may be necessary to calibrate its response in an empirical manner to allow for non-linearities in the variation of resonance frequency with changing mass flow rates.

The principle behind the second aspect of the invention is explained with reference to FIG. 7.

Figure 7:
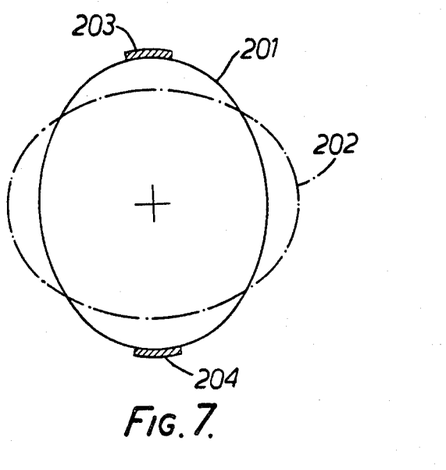
FIGS. 7, 8a and 8b are explanatory diagrams, relating to the second aspect of the invention.

Referring to FIG. 7, there is shown therein a hollow thin walled cylinder located inside a pipe (not shown) containing a flowing liquid which has a component of motion directed circumferentially around the outside of the cylinder. The cylinder 201 itself may be made of metal, glass or ceramic or similar material but it is preferably formed of metal. A circumferential flexural vibration is induced in the cylinder 201 by means of a suitable transducer 203, which may be piezo electric or electro-magnetic in nature and which is driven from a suitable alternating current source having the required frequency. The frequency of the current source is adjusted to be equal to one of the flexural resonance frequencies of the cylinder 201, preferably at the frequency which generates the fundamental flexural mode of vibration. The extreme positions of movement of the surface of the cylinder 201 are shown much exaggerated by the ellipses 201 and 202 for the fundamental flexural mode. The flexural vibration can be regarded as being a standing wave formed by interference of two travelling flexural waves which travel in mutually opposite directions around the circumference of the cylinder.

When a fluid is caused to flow over the outer surface of the cylinder 201 with a component of velocity tangential to the surface of the cylinder, i.e. it flows around the circumference of the cylinder rather than merely in a direction aligned with the axis of the cylinder, the travelling flexural wave which travels in the same direction as the fluid is increased in frequency, whilst the other wave is reduced by a similar amount. The result of the combination of these two travelling waves is a single standing wave at the resonant frequency of the cylinder, but which is amplitude modulated at the difference frequency of the two travelling waves.

Figure 8A:
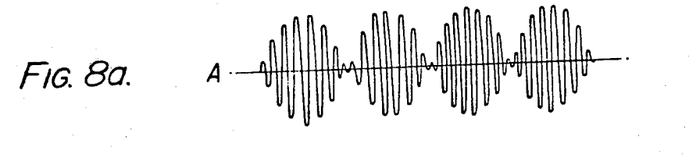
Figure 8B:
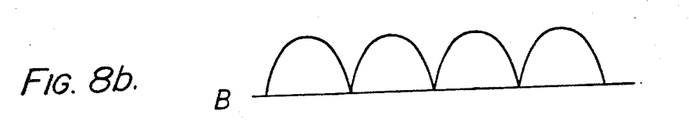

The nature of the amplitude modulated standing wave is illustrated in line A of FIG. 8a and its presence is monitored by a second transducer 204 located at some point on the surface of the cylinder 201 which is spaced circumferentially apart from the transducer 203. The second transducer 204 produces an electrical signal from which the amplitude modulation can be extracted and the mass flow rate of the liquid over the surface of the cylinder 201 can be obtained from a knowledge of the amplitude modulation frequency and the resonance frequency of the cylinder 201. The way in which the mass flow rate is derived is explained subsequently with reference to FIGS. 9 and 10. The envelope of the modulated waveform is illustrated diagrammatically in line B of FIG. 8b and it is from this waveform that the amplitude modulation is measured.

The theoretical basis of the operation of the mass flow measurement device is indicated as follows. The point on the surface of the cylinder 201 can be represented in cylindrical co-ordinates by (R, θ) where the cylinder axis is taken as the origin, and $$R = R_o + r$$

where $R_o$ is the normal cylinder radius and r is the radial deformation in the cylinder wall resulting from the vibration. The deformation $r_1$ due to the flexural wave travelling in the same direction as the fluid flow can be represented as the real part of the expression, $$r_1 = r_o \exp j(\omega t + \omega_1 t + N\theta)$$

where $r_o$ is the peak amplitude of the wave, ω is the angular frequency of cylinder vibration in a stationary fluid, $\omega_1$ is the angular frequency increase due to the fluid motion, N is an integral mode number equal to the number of full wavelengths in the circumference of the cylinder (N=2 for the fundamental flexural vibration). The deformation $r_2$ due to the wave travelling in the direction opposite to the fluid flow can be represented by the real part of the expression $$r_2 = r_o \exp j(\omega t - \omega_1 t + N\theta)$$

and the sum of the two waves giving the total vibration amplitude is $$r = r_1 + r_2 = 2r_o \exp j\omega t \cdot \cos(\omega_1 t - N\theta)$$

The transducer 204 which may be placed at any point on the circumference of the cylinder 1 will produce an output signal proportional to r, which has a waveform of the kind shown in line A of FIG. 8a. When this waveform is rectified in a detector circuit and the carrier frequency ω is removed by means of a low pass filter, the output signal consists of rectified half cycles as shown in line B of FIG. 8b. This rectified signal has a frequency signal to $2\omega_1$.

Figure 9:
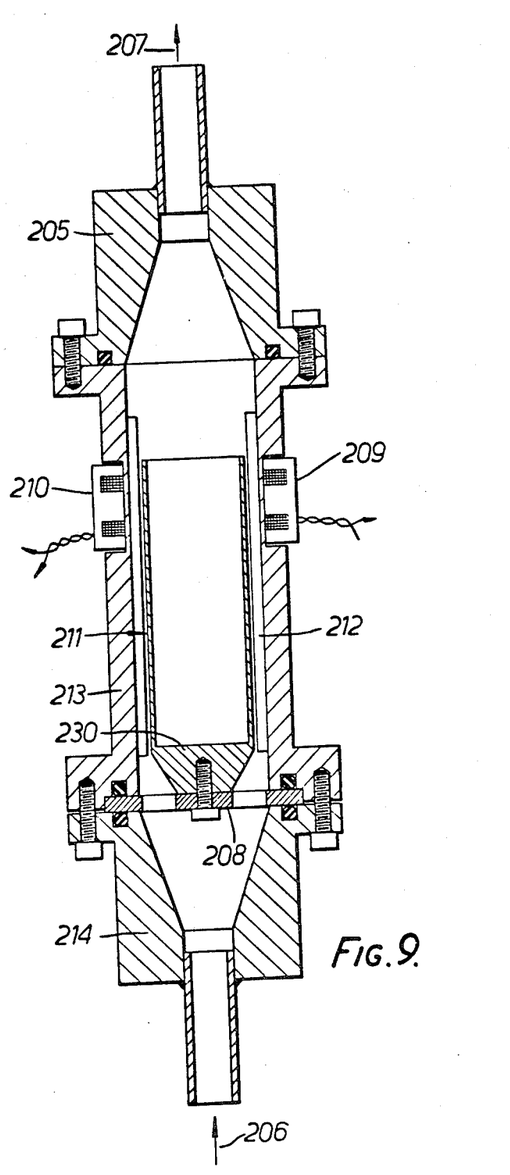
FIG. 9 shows part of a mass flow measurement device in accordance with the second aspect and FIG. 10 shows a measurement circuit associated with said device of FIG. 9.

The above analysis assumes that the liquid flows over the surface of the cylinder 201 with a circumferential component of motion which is directly related to the total volume of liquid flowing. A mass flow measurement device which enables this condition to be satisfied is illustrated in FIG. 9. In FIG. 9, a thin walled cylinder 211 is mounted within a pipe 213 by means of a closed boss 230 attached to one end of the cylinder. The axis of the cylinder 211 coincides with that of the axis of the pipe 213 and the cylinder is held in this position by means of a rigid locating plate 208, which contains holes which allow the fluid to flow through it with the minimum of obstruction. An array of helical vanes 212 are located on the inside wall of the pipe 213. The vanes extend very close to the outer wall of the cylinder 211, but do not actually touch it.

In operation, fluid enters the pipe 213 at port 206 and flows through the annular space between the cylinder 211 and the pipe 213. The helical vanes 212 impart a rotary or swirling motion to the fluid, and the rate of angular rotation is proportional to the forward flow rate of the fluid. The fluid is expelled from the measurement device via port 207 at a removable end flange 205. A similar end flange 214 is positioned adjacent to the input port 206. These flanges are removable to facilitate assembly or dis-assembly of the internal parts of the mass flow measurement device.

The electro-magnet 209 is attached to the outer surface of the pipe 213 at a position close to the free end of the cylinder 211 and is driven from a source of alternating current at the fundamental resonance frequency of the cylinder. A similar electro-magnet 210 is also attached to the pipe 213 to provide an output signal which is dependent on the frequency and amplitude of vibration of the cylinder 201. The way in which the driving currents are generated and the resulting vibration is monitored is indicated in FIG. 10.

Figure 10:
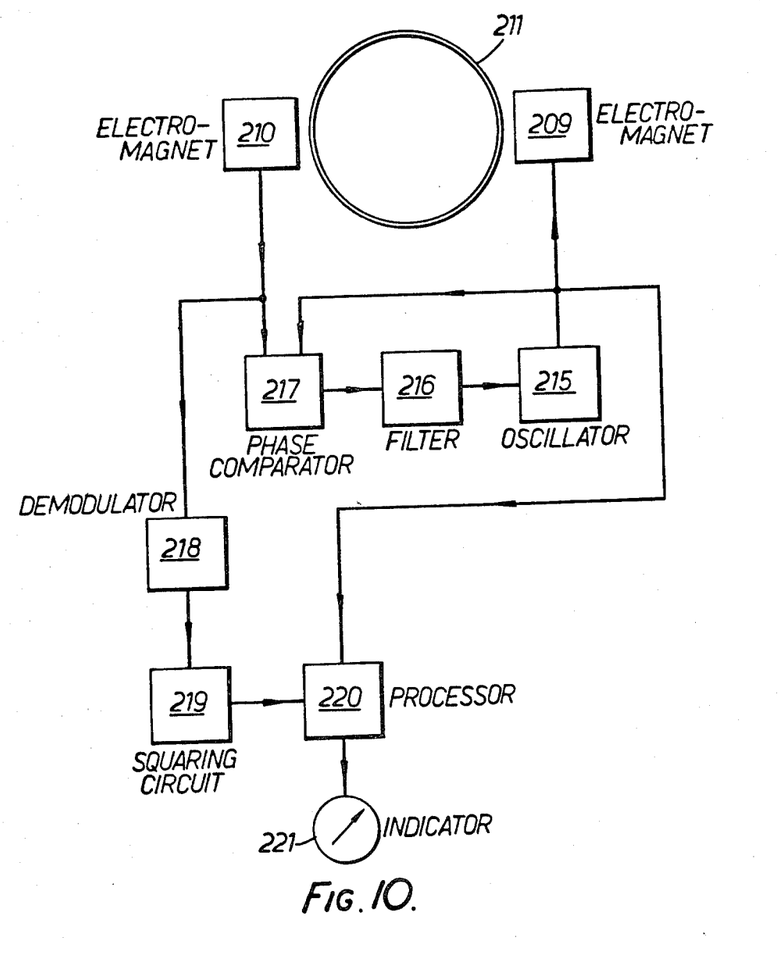

Referring to FIG. 10, the electro-magnet 209 is driven from a variable frequency oscillator 215 which is concerned to oscillate at the resonance frequency of the cylinder 211. Sensor electro-magnet 210 generates an output signal dependent on the vibration amplitude of the cylinder 211 and the form of the signal corresponds to that shown in line A of FIG. 8a. This signal is compared in phase with the output frequency of oscillator 215 at a phase comparator 217. The output from the phase comparator 217 forms part of a closed feedback loop and is fed via a low pass filter 216 to control the oscillation frequency of the variable oscillator 215. The phase locked loop so formed ensures that the oscillator 215 continues to oscillate at a frequency which produces a fixed predetermined phase difference between the input current applied to the electro-magnet 209 and the output current sensed by the electro-magnet 210. Typically, the phase difference is zero. It will be appreciated that small changes in the resonance frequency of cylinder 211 arising from for example, a change in fluid density or a change in temperature of cylinder 211 cause a compensating shift in the frequency of oscillator 215, so that the cylinder 211 is maintained at its resonance frequency. The output of the electro-magnet 210 also contains an amplitude modulation and this is fed to a demodulator circuit 218, which is operative to produce an output at the modulation frequency. The modulation frequency is applied to a squaring circuit 219, which converts each cycle of the modulation frequency into a square pulse which is then fed into a processor circuit 220 from which the mass flow rate is determined. The appropriate value of mass flow rate is displayed at an indicator 221.

An analysis of the operation of the device shows that the modulation frequency $2\omega_1$ is given approximately by the expression $$2\omega_1 = \frac{V_o \rho}{\rho_o t \tanh \frac{Nl}{R}} \left(\frac{\omega}{\omega_o}\right)^2$$

where $V_o$ is the circumferential component of fluid velocity around the cylinder, ρ is the fluid density, $\rho_o$ is the density of the cylinder material, t is the cylinder wall thickness, l is the width of the annular space between the cylinder 211 and the wall of the pipe 213, R is the outer radius of the cylinder 211 and N is the mode number, ω is the angular frequency of resonant vibration of the cylinder in the fluid and $\omega_o$ is the angular frequency of resonant vibration of the cylinder in vacuum.

$2\omega_1$ is therefore directly proportional to $V_o$, but $2\omega_1$ is not directly proportional to the fluid density because ω depends on the fluid density. ω is approximately given by the relation $$\omega = \omega_o \left[ 1 + \frac{\rho}{\rho_o \frac{Nt}{R} \tanh \frac{Nl}{R}} \right]^{-\frac{1}{2}}$$

The quantity $2\omega_1/\omega^2$ is proportional to the product $V_o\rho$ and so is proportional to the mass flow rate of fluid around the cylinder circumference, which in turn is proportional to the mass flow rate of fluid through the device from input port 6 to the output port 207. In order to produce an output on indicator 221 equal to the mass flow rate, the processor circuit 220 calculates the quantity $2\omega_1/\omega^2$, and it is for this reason that it directly receives $\omega$, the output frequency of oscillator 215. As the calculation is particularly simple, it may be performed by a simple and inexpensive calculator or microcomputer. Alternatively the calculation may be performed by a central computer common to a large number of devices if this is more convenient.

The principle behind the third aspect of the invention is explained with reference to FIG. 11.

Figure 11:
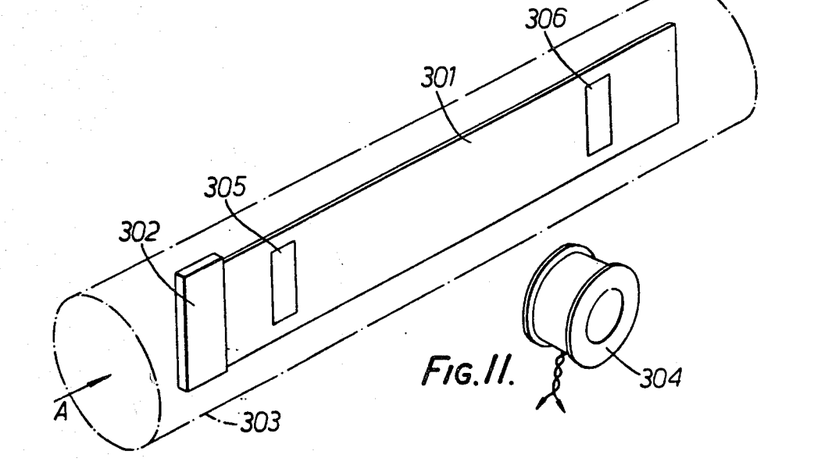
FIG. 11 shows a simplified perspective view of a mass flow measurement device in accordance with the third aspect of the present invention for the purpose of explanation.

Referring to FIG. 11, the mass flow measurement device consists of a thin strip 301 of elastic material such as metal mounted inside a hollow tube 303 through which fluid flows in the direction of arrow A when the device is operating. The strip 301 is anchored at one end to the inside wall of the tube 303 by means of a cross piece 302, which is designed to have a relatively small cross-section so as to impede the flow of liquid in the tube 303 as little as possible. The strip 301 is positioned on the axis of the tube 303 and has a width which is only slightly less than the internal diameter of the tube. The length of the strip 301 is such that it extends along the axis of the tube for a distance which is equal to at least several tube diameters. The strip 301 is provided with two piezo electric transducers 305 and 306, which are bonded on to the surface of the strip 301 at points which are close to the opposite ends of the strip. An electromagnet 304 is positioned outside the tube 303 and is arranged to excite the strip 301 into vibration. Conveniently, the strip is formed of a ferro-magnetic material e.g. steel and the electro-magnet 304 is driven from an a.c. current source at a frequency which is equal to one or other of the flexural resonance frequencies of the strip. Conveniently the frequency corresponds to the fundamental resonance mode and the way in which the driving frequency is controlled to achieve this condition is described in connection with FIG. 13.

Alternatively a piezo electric transducer attached to the strip may be used to drive the vibration in place of electro-magnet 304.

The transducers 305 and 306 are designed to produce an electrical output signal which is proportional to the instantaneous displacement of the strip 301 in a direction transverse to the tube axis. Alternative forms of transducer can be designed to produce an output signal which is proportional to the transverse velocity of the strip, the transverse acceleration or the inverse of the bending radius of the strip. Although in FIG. 11, piezo electric transducers are used, alternative transducers may be electro-magnetic or optical in character mounted inside or outside the tube. Nevertheless, preferably the transducers consist of piezo electric material which is bonded on to the surface of the strip 301 and protected from contact with the liquid itself by means of an insulating coating.

When there is no flow of liquid in the tube 303, the mode of vibration of the strip 301 is in the form of a standing wave in which, although the amplitudes of the signal from the two transducers 305 and 306 may be different, they both have the same phase in relation to the sinusoidal driving current applied to the electromagnet 304. When a fluid flows along the tube 303, this condition is no longer present and a phase difference is produced between the output signals from the two transducers 305 and 306.

It can be shown by an approximate analysis that the phase shift $\Delta\phi$ between the two signals is equal to:

$$\Delta\phi = \frac{\omega k_o L}{2\omega_o^2 \rho_o t \tanh(k_o R)} V_o \rho$$

where $\omega$ is the angular resonance frequency of flexural vibration of the strip in the liquid, $\omega_o$ is the angular resonance frequency of flexural vibration of the strip (in the same vibrational mode) in vacuum, L is the distance between the two output transducers, $\rho_o$ is the density of the strip material, t is the thickness of the strip material, R is the internal radius of the tube, $k_o$ is $2\pi$ divided by the wavelength of the flexural wave along the strip, and $V_o\rho$ is the product of the liquid velocity $V_o$ along the pipe and the density $\rho$ of the liquid. $V_o\rho$ is consequently the mass flow rate of liquid along the pipe.

The angular frequency $\omega$ is dependent on the liquid density $\rho$ so that the phase shift $\Delta\phi$ is in general not directly proportional to liquid density. However the quantity $\Delta\phi/\omega$ which is equal to the time delay between corresponding points on the two output waveforms is directly proportional to the liquid density $\rho$ and hence is proportional to the mass flow rate. consequently a circuit which directly measures this time delay produces an output proportional to the mass flow rate.

The analysis from which the above expression is derived is based on a number of assumptions: firstly that the liquid does not have an excessively high viscosity, secondly that the liquid completely fills the tube, thirdly that vibration of the tube generated by external sources does not produce a significant amplitude of vibration of the strip at the measurement frequency, and fourthly that the flow of liquid in the tube is fully turbulent, as under conditions of laminar flow the sensitivity of the device is different.

Figure 12A:
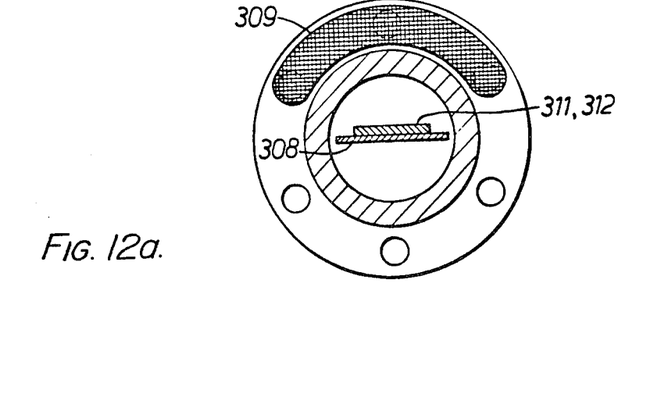
FIGS. 12a and 12b show sectional views of a more practical device.
Figure 12B:
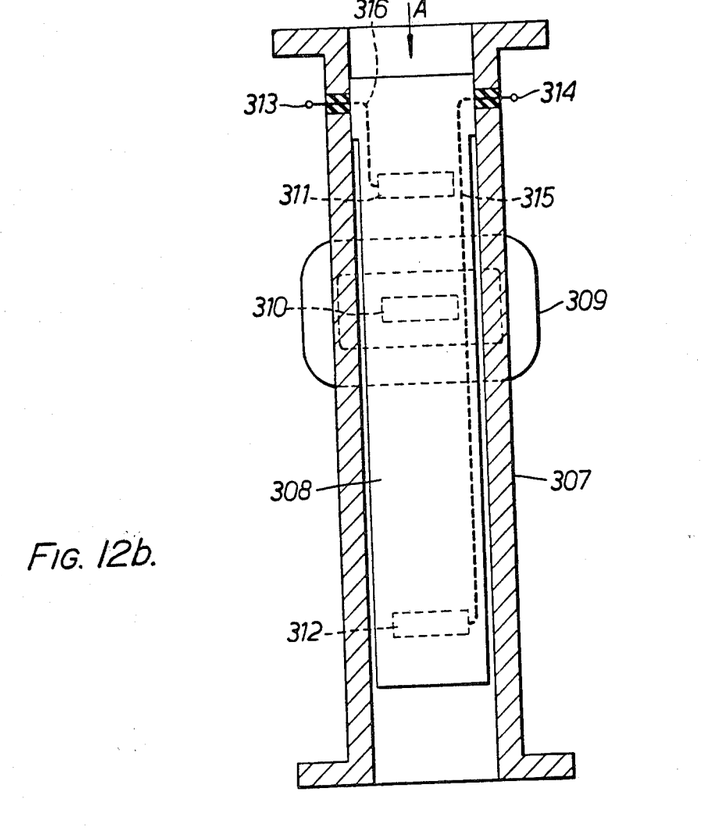
Figure 13:
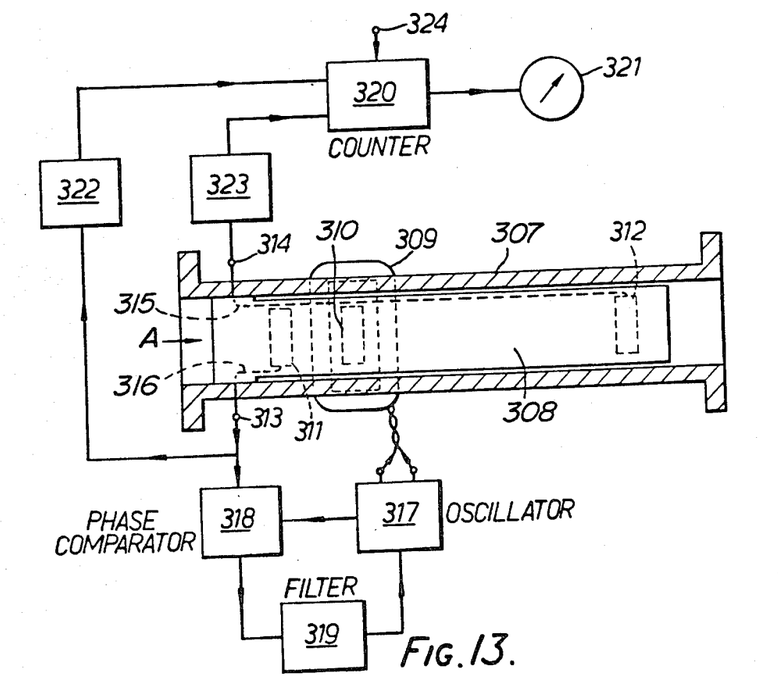
FIG. 13 shows the device of FIGS. 12a and 12b in combination with circuits which generate an output signal representative of mass flow.

The way in which an output signal representative of the mass of fluid flowing through the tube 303 is generated is explained with particular reference to FIGS. 12a, 12b and 13. The basic device is similar in principle to the explanatory diagrammatic form shown in FIG. 11.

A tube 307 made of a non-ferromagnetic material such as aluminium alloy contains the flowing liquid to be measured and which flows in the direction of arrow A. The tube has flanged ends for connecting into a piping system. A thick metal strip or vane 308 is positioned inside the tube, on axis, and is rigidly anchored to the tube wall at one end, for example by welding. The vane 308 extends along the length of the tube a distance equal to several tube diameters, and has a width nearly equal to the tube diameter but is positioned such that the vane edges are clear of the tube wall. A coil 309 is positioned on the outside of the tube 307 and is connected to a source of a.c. current so that the magnetic field generated by coil 309 periodically attracks a piece of ferromagnetic material 310 attached to vane 308 at a position which is close to coil 309. Alternatively the whole of vane 308 can be made of a ferromagnetic material as in FIG. 11, in which case the piece of ferromagnetic material 310 is superfluous. Transducers 311 and 312 comprising slabs of piezo electric material are attached to vane 308 close to each end by means of epoxy resin. Insulated wires 315 and 316 are taken from the transducers 311 and 312 along the surface of the vane 308 to insulated terminals 313 and 314 which pass through the wall of tube 307. The transducers produce output voltages at terminals 313 and 314 proportional to the inverse bending radius of vane 308 at the points of attachment. Transducers 311 and 312 are insulated from the liquid in tube 7 by a coating of epoxy resin or by an insulated metallic top cap (not shown).

In operation the electro-magnet 309 is supplied with an alternating current from a voltage controlled oscillator 317. The output frequency of the oscillator 317 is adjusted to be equal to one of the flexural resonance frequencies of the vane 308. In order to maintain the oscillation frequency exactly at the selected resonance frequency, a phase locked loop is used to monitor the actual flexural vibrations present in the vane 308. The output from transducer 311 is fed via the terminal 313 to one input of a phase-sensitive detector 318, where it is compared in phase with the output from oscillator 317. If these two signals are not exactly in phase, an error signal proportional to the phase difference is generated by the phase-sensitive detector 318 and is fed via a low pass filter 319 to the frequency control input of the voltage controlled oscillator 317. The oscillator 317, the detector 318 and the filter 319 comprise a feedback loop which ensures that the oscillator 317 is maintained at a frequency which produces a fixed predetermined phase difference between the input current applied to the coil of the electro-magnet 309 and the output signal obtained from transducer 311.

Any change in resonance frequency of the vane 308 arising, for example, from a change in liquid density in the fluid or from a change in temperature of the vane 308 causes a compensating shift in the frequency of oscillator 317, so as to maintain it at the selected resonance frequency.

A signal indicative of the mass flow rate of the fluid (usually a liquid) flowing in the tube 307 is obtained by applying the sinusoidal output signals from transducers 311 and 312 to respective squaring circuits 322 and 323, which operate to generate two corresponding pulse trains. The time difference between corresponding edges of the squared pulses provided by circuits 322 and 323 is measured at a counter 320. A very high frequency is fed via input terminal 324 to the counter 320 with one circuit 322 enabling the counter and the other circuit 323 inhibiting the counter. In this way the time difference between corresponding edges of the square wave pulses is measured in terms of the number of cycles of the high frequency present at terminal 324. The output from the counter 320 is fed to an appropriate indicator 321 as the measured time difference is proportional to the mass flow rate of the fluid in tube 303. This corresponds to the time delay $\Delta\phi/\omega$ defined previously.

I claim:

1. A mass flow measurement device comprising means for generating a traveling flexural wave in the surface of a body, said body being in the form of a thin walled hollow cylinder having an outer cylinder surface, said cylinder being rigidly supported at at least one end, with the flexural wave being arranged to travel circumferentially around the outer surface of the cylinder, and said cylinder being mounted so that its outer surface forms part of an annular chamber, means for causing fluid to flow over at least part of the outer surface of said cylinder, with the fluid being arranged to enter and leave said chamber via input and output ports respectively and the fluid being constrained to flow circumferentially around the outside of the cylinder from the input port to the output port; and means for detecting the effect of the fluid on the wave velocity of the flexural wave, wherein the frequency of the traveling flexural wave is controlled to maintain said cylinder in resonance.

2. A mass flow measurement device comprising means for generating a traveling flexural wave in the surface of a body, said body being in the form of a thin walled hollow cylinder having an outer cylinder surface, said cylinder being rigidly supported at at least one end, with the flexural wave being arranged to travel circumferentially around the outer surface of the cylinder, and said cylinder being mounted longitudinally within a duct; means for causing fluid to flow along said duct and over at least part of the outer surface of said cylinder and wherein deflector means are provided for imparting to the fluid a component of motion which is directed around the surface of the cylinder; and means for detecting the effect of the fluid on the wave velocity of the flexural wave, wherein the frequency of the traveling flexural wave is controlled to maintain said cylinder in resonance.

3. A device as claimed in claim 2 and wherein the deflector means comprises a ring of fixed turbine blades positioned in the duct so as to rotate the body of the fluid as it flows along the duct.

4. A mass flow measurement device comprising means for generating a traveling flexural wave in the surface of a body, said body being in the form of a thin walled hollow cylinder having an outer cylinder surface, said cylinder being rigidly supported at at least one end, with the flexural wave being arranged to travel circumferentially around the outer surface of the cylinder, wherein the means for generating the travelling flexural wave comprises two transmitting transducers spaced apart by a multiple (including unity) of approximately a quarter wavelength of the flexural wave, with signals being applied to the two transducers having a relative phase such that the travelling flexural wave travels in a single direction around the cylinder; means for causing fluid to flow over at least part of the outer surface of said cylinder and for constraining the fluid to flow around the cylinder with its motion having a circumferential component; and means for detecting the effect of the fluid on the wave velocity of the flexural wave, wherein the frequency of the traveling flexural wave is controlled to maintain said cylinder in resonance.

5. A device as claimed in claim 4 and wherein means are provided for detecting the travelling flexural wave, and comparing its phase with signals related to those signals applied to said transmitting transducers, and further including means responsive to said comparison for controlling the frequency of the signals applied to said transmitting means so as to maintain said cylinder in resonance.

6. A device as claimed in claim 1, 2 or 4 and wherein the frequency of resonance is indicative of the mass flow rate of said fluid.

7. A device as claimed in claim 1, 2 or 4 and wherein the direction of travel of the travelling flexural wave is periodically reversed so as to minimize errors in the determination of the mass flow rate.

8. A mass flow measurement device comprising means for generating a traveling flexural wave in the surface of a body, said body being in the form of a thin walled hollow cylinder having an outer cylinder surface, said cylinder being rigidly supported at at least one end, with the flexural wave being arranged to travel circumferentially around the outer surface of the cylinder, and said cylinder being mounted longitudinally within a duct; means for causing fluid to flow along said duct and over at least part of the outer surface of said cylinder; deflector means provided within said duct for imparting to the fluid a component of motion which is directed around the surface of the cylinder; and means for detecting the effect of the fluid on the wave velocity of the flexural wave, wherein the frequency of the traveling flexural wave is controlled to maintain said cylinder in resonance.

9. A device as claimed in claim 8 and wherein the deflector means comprise a plurality of helical vanes positioned within the duct and around, but spaced apart from, said body.

10. A device as claimed in claim 4 or 9 and including means for monitoring said travelling flexural wave, and for detecting an amplitude modulation therein indicative of fluid flow over said surface.

11. A mass flow measurement device comprising means for generating a travelling flexural wave in the surface of a body, said body being in the form of a thin vane rigidly clamped at one of its ends to the internal surface of a hollow tube and extending along the direction of the axis of the tube; means for causing fluid to flow over said surface, with the fluid being constrained to flow, in operation, through said tube; and means for detecting the effect of the fluid on the wave velocity of the flexural wave, wherein the frequency of the travelling flexural wave is controlled to maintain said vane in resonance.

12. A mass flow measurement device comprising means for generating a travelling flexural wave in the surface of a body, said body being in the form of a thin vane rigidly clamped at one of its ends to the internal surface of a hollow tube and extending along the direction of the axis of the tube; means for causing fluid to flow over said surface, with the fluid being constrained to flow, in operation, through said tube; means for monitoring the phase of the flexural wave at at least two points on the body with the different points being spaced apart in the direction of the fluid flow; and means for detecting the effect of the fluid on the wave velocity of the flexural wave, wherein the frequency of the traveling flexural wave is controlled to maintain said vane in resonance.

13. A device as claimed in claim 12 and wherein means are provided for producing an output signal which has a reference value when no fluid is flowing over said body and which increases in dependence on the resulting phase difference at said points when the fluid flows.

14. A device as claimed in claim 11, 12 or 13 and wherein piezo electric sensors are positioned at two points along the thin vane so as to enable the relative phases of the flexure waves to be monitored at those points.

* * * * *